June 9, 1942. H. H. HITTSON 2,285,434
APPARATUS FOR OPERATING A VIBRATORY CONVEYER OR MOTOR
Filed Oct. 22, 1938 3 Sheets-Sheet 1

INVENTOR:
HARKER H. HITTSON,
By
Chas. M. Nissen,
ATT'Y.

June 9, 1942.  H. H. HITTSON  2,285,434
APPARATUS FOR OPERATING A VIBRATORY CONVEYER OR MOTOR
Filed Oct. 22, 1938  3 Sheets-Sheet 3
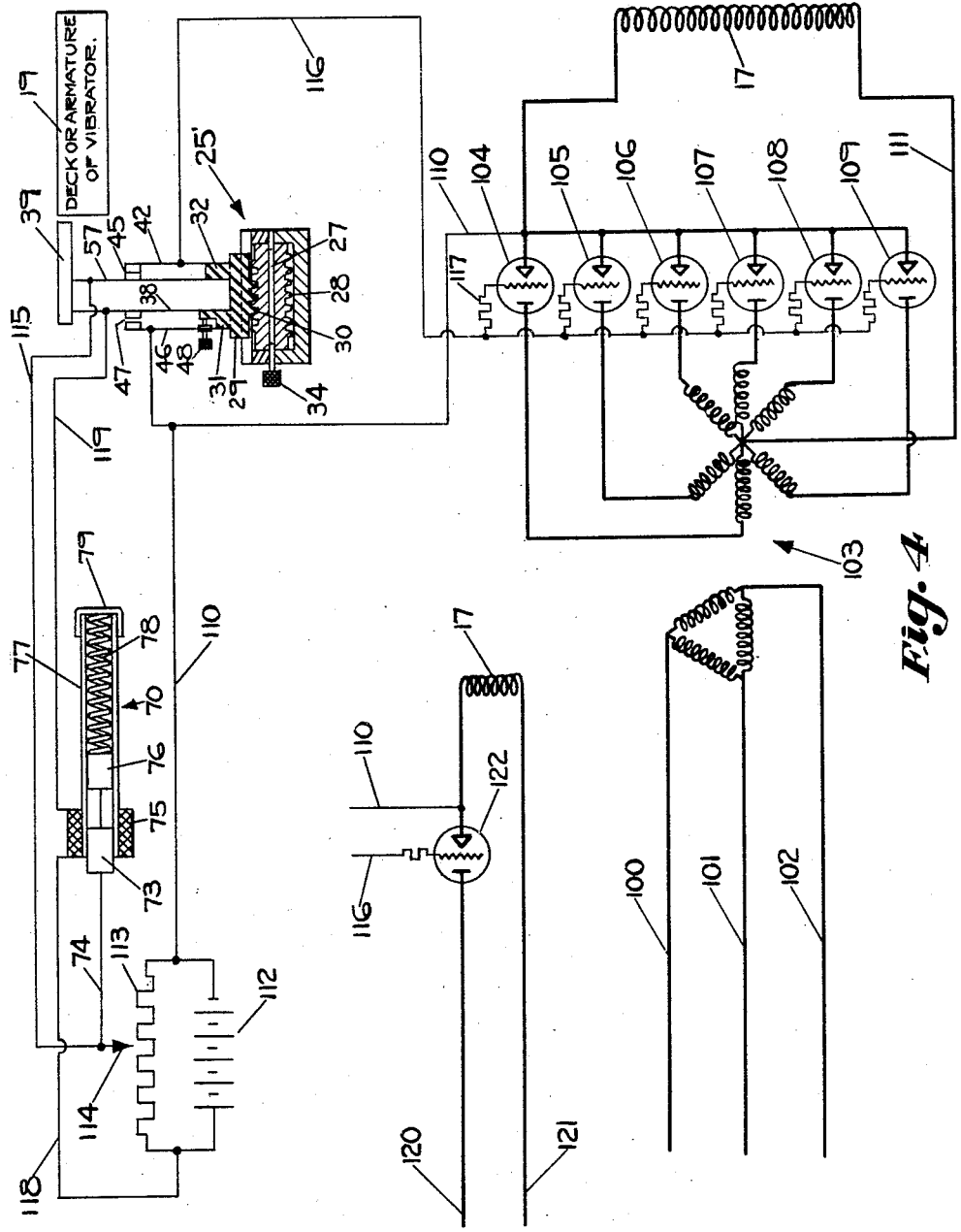
INVENTOR:
HARKER H. HITTSON,
By
Chas. M. Nissen,
ATTY.

Patented June 9, 1942

2,285,434

UNITED STATES PATENT OFFICE 2,285,434

APPARATUS FOR OPERATING VIBRATORY CONVEYERS OR MOTORS

Harker H. Hittson, Columbus, Ohio, assignor to The Jeffrey Manufacturing Company, a corporation of Ohio Application October 22, 1938, Serial No. 236,544

13 Claims. (Cl. 172—240)

This invention relates to a system or apparatus for operating a vibratory conveyor or a vibratory motor.

An object of the invention is to provide a vibratory conveyor or a vibratory motor having a natural period of vibration with means to control the feeding of current impulses to said conveyor or motor at a frequency to be determined by the natural period of vibration of the vibratory system of the conveyor or motor from any source of current, which may be either alternating current of any frequency and number of phases, or direct current; by controlling the asymmetric flow of current as through an electron relay or tube, preferably of the vapor or gaseous electric discharge type, and to provide means to maintain substantially constant the amplitude of vibration thereof independent of the load thereon, particularly by varying the conductivity of a thermionic relay or tube.

Other objects of the invention will appear hereinafter, the novel features and combinations being set forth in the appended claims.

In the accompanying drawings,

Fig. 3 shows a modification of the circuit diagram of Fig. 2;

Fig. 4 shows another form of circuit diagram with a six phase out-put circuit; and Fig. 5 shows a modification of the circuit of Fig. 4 employing direct current as the primary source of current supply.

Figure 1:
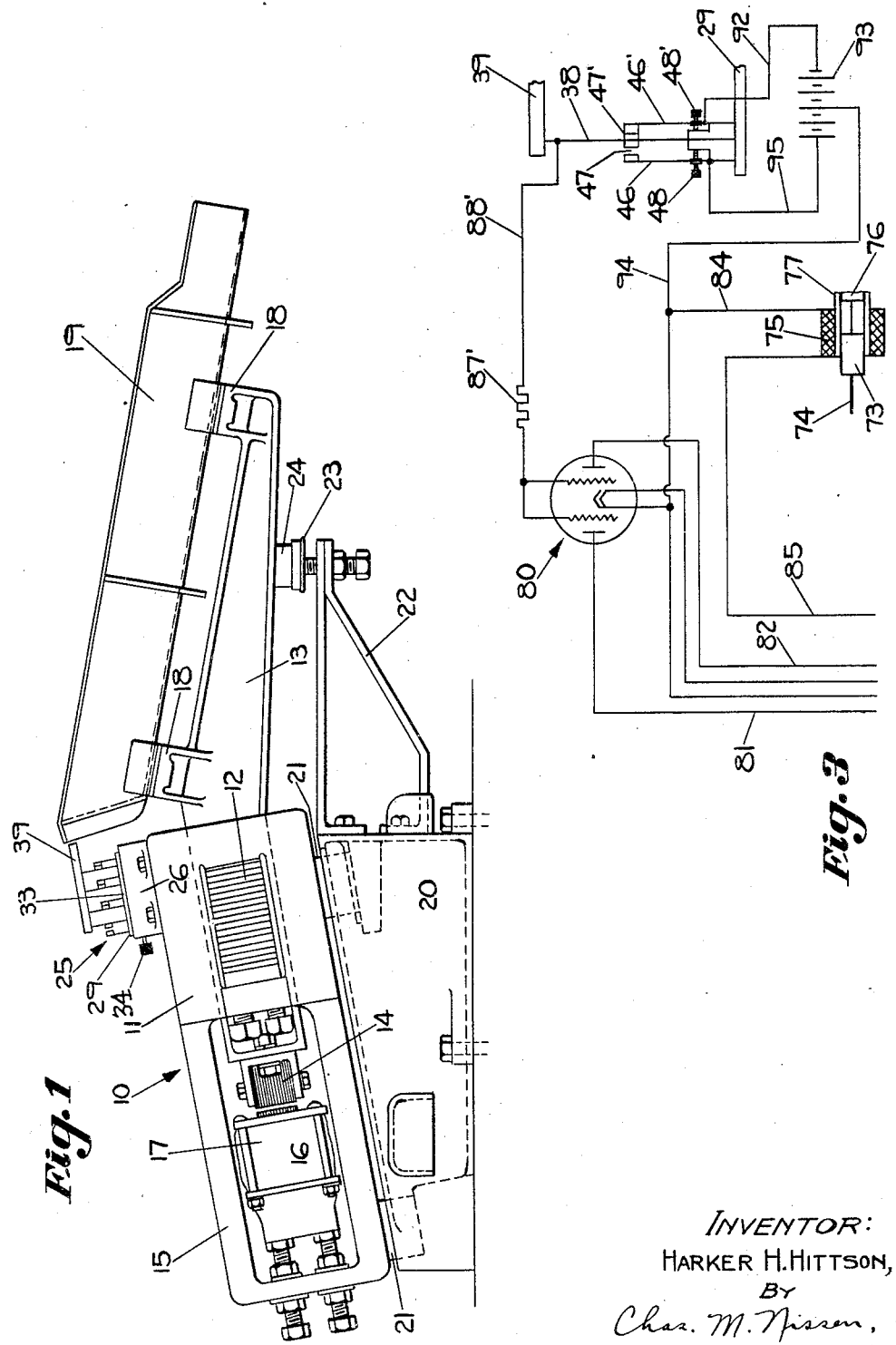
Fig. 1 is a side elevational view of a vibratory feeder including a vibratory motor which forms a part of my invention.

Vibratory conveyors and vibratory motors for operating such conveyors, as well as vibratory motors designed for other uses, such as for the operation of screens, barrel packers, coolers, driers, etc., heretofore manufactured, include a class of equipment in which a vibratory mechanical system is provided having a natural period of vibration which is predetermined at a value near to but not equal to the frequency of the available electrical current. For example, it was quite common to provide a vibratory motor operating any of the above mentioned types of apparatus which had a natural period of vibration of 58 cycles which is operated from 60 cycle current.

Certain definite limitations exist with such apparatus. In the first place, it is essential that the frequency of the source of electric supply be substantially constant. In many parts of the United States where power is supplied by large public service power plants the frequency is substantially constant, but in other parts of the United States and in many foreign countries the frequency of the power source varies appreciably, this being true in the United States particularly where a small or local power plant is the source of power. It is manifest that under conditions of variable in-put frequency the predetermined relation necessary for the proper operation of the vibratory motors does not exist and as a consequence it has been impractical, if not entirely impossible, to supply these vibratory conveyors or motors where such conditions of variable frequency prevail.

There is another inherent objection to adjusting the natural period of vibration to or near to the frequency of the power line. This adjustment requires an appreciable amount of time in the process of manufacture because it is impossible to calculate with absolute accuracy the natural period of vibration of any vibratory system, and while a close approximation can be realized from calculations a certain amount of trial and error is necessary in the building of the complete machine which consumes time and increases costs.

Still further, it is a fundamental fact that for the maximum efficiency and vibratory motor should vibrate substantially in exact resonance with the supplied current or, in other words, at its natural period of vibration, but it has been found in the commercial machines above mentioned that this has an undesirable result in that the amplitude of vibration of the motor varies appreciably with the load on the material supporting surface or deck. As a result it has been inadvisable to tune the vibratory mechanical system in exact resonance with the current supplied because the amplitude of vibration may become excessive and injure the machine under no-load conditions if the current supplied is sufficient under full-load conditions to do the work efficiently and effectively.

All of the above mentioned deficiencies have been overcome in the apparatus and method of my invention. That is, the vibratory conveyor or motor may be operated from any source of current which may be either direct or alternating current, and if the latter, of any number of phases, without regard to whether the frequency of the alternating current is fixed or variable. Furthermore, the vibratory motor or conveyor operates substantially at its natural period of vibration, therefore, resulting in maximum efficiency. An exact predetermination of the natural period of vibration is also unnecessary.

Still further, this makes possible any desired frequency of operation quite independent of the frequency of the in-put current (and by the use of the term "frequency of in-put current" or the equivalent, it is to be understood that applicant also includes direct current which has a frequency of zero), and this is extremely desirable because under many conditions a relatively low frequency of operation is desired which under known practical methods cannot be realized from any commercial frequencies normally available.

In addition, the apparatus and method of my invention includes a control of the amplitude of vibration of the vibratory motor and conveyor which is entirely automatic in action and insures a substantially constant amplitude of vibration of the conveyor or motor, which amplitude may be variably adjusted.

Referring to Fig. 1 of the drawings, there is disclosed a vibratory conveyor, the general structure of which is disclosed in more complete detail in the application of Earle V. Francis, Serial No. 221,868, filed July 28, 1938, now Patent No. 2,161,342, dated June 6, 1939, entitled Vibratory feeder, to which reference is made for a more complete disclosure thereof except for specific differences herein pointed out. Said vibratory conveyor may be briefly described as comprising an electro-magnetic motor 10 formed by a main frame 11 to which is attached a plurality of spring bars 12 the ends of which are clamped in said main frame 11 and the centers of which are clamped to an armature shaft 13 to which is attached a vibratory armature 14.

Mounted on the main frame 11 is a bracket means 15 to which is adjustably attached a field structure 16 including a field winding 17. The armature shaft 13 is provided with front and rear brackets 18 upon which is supported a deck 19 adapted to receive material at its upper end, for example from a feed hopper, and discharge it over its lower end. While the deck 19 is shown sloping downwardly this is not at all essential for it may be horizontal or it may even be inclined upwardly to a slight extent.

The motor 10 is supported from a base 20 by a plurality of rubber cushion members 21. To aid in supporting the armature shaft 13, particularly to prevent distortion of the spring bars 12 by twisting, the base 20 carries a forward extending bracket 22 which supports an adjustable cup 23 carrying a rubber cushion 24 upon which the armature shaft 13 rests adjacent its forward portion.

Mounted upon the main frame 11 is a switch mechanism 25 which comprises a base 26 rigidly attached to said main frame 11 within which is mounted a shaft 27 (see Fig. 2), keyed to a worm 28 which meshes with a sliding bar 29 having teeth 30 thereon which mesh with the teeth of the worm 28. The bar 29 is preferably made of insulating material and carries a plurality of integral or attached upstanding bosses including an end boss 31 and three forward bosses 32. The base 26 provides appropriate lateral bearing surfaces along the sides thereof for the sliding bar 29 to support it for free sliding movement. Adjacent one side edge of the bar 29 and the top of the base 26 is a micrometer type scale 33 (see Fig. 1) by which the position of the slide bar 29 may be determined to give a direct reading of the amplitude of vibration of the armature shaft 13 and deck 19.

To provide for rotation of the worm 28 the shaft 27 is provided with a knurled handle 34. There is preferably sufficient friction on the shaft 27 and/or on the worm 28 to hold it in any position to which it is adjusted, in spite of the vibration of the motor. If desired, clamping means may be added to clamp the sliding bar 29 releasably in any position of adjustment.

Extending upwardly from the rear ends of bosses 32 are flat flexible spring plates 35, 36 and 37, such as bronze springs, each carrying a forwardly extending switch contact which, for example, may be made of tungsten. Also extending upwardly from the forward end of boss 31 is a similar spring plate 38 which carries a rearwardly extending switch contact. The upper ends of the spring plates 35, 36, 37 and 38 are attached to a striking plate 39 preferably made of insulating material which is adapted to be positioned adjacent to or in contact with the deck or armature of the conveyor or the vibratory motor armature.

Extending upwardly from the forward ends of the bosses 32 is a plurality of spring plates 40, 41 and 42 which terminate in switch contacts which cooperate with the previously mentioned switch contacts on spring plates 35, 36 and 37 to provide normally closed switches or circuit makers and breakers 43, 44 and 45. Also extending upwardly from the rear end of boss 31 is a spring plate 46 carrying at its upper end a switch contact which cooperates with the previously mentioned switch contact on spring plate 38 to form a normally open switch or circuit maker and breaker 47. Associated with the spring plate 46 is means for adjusting the air gap between the contacts of switch 47 which may take the form of a knurled screw 48 threaded through a boss on the spring plate 46 and abutting an upstanding abutment on the boss 31, as illustrated in Fig. 2 of the drawings.

Figure 2:
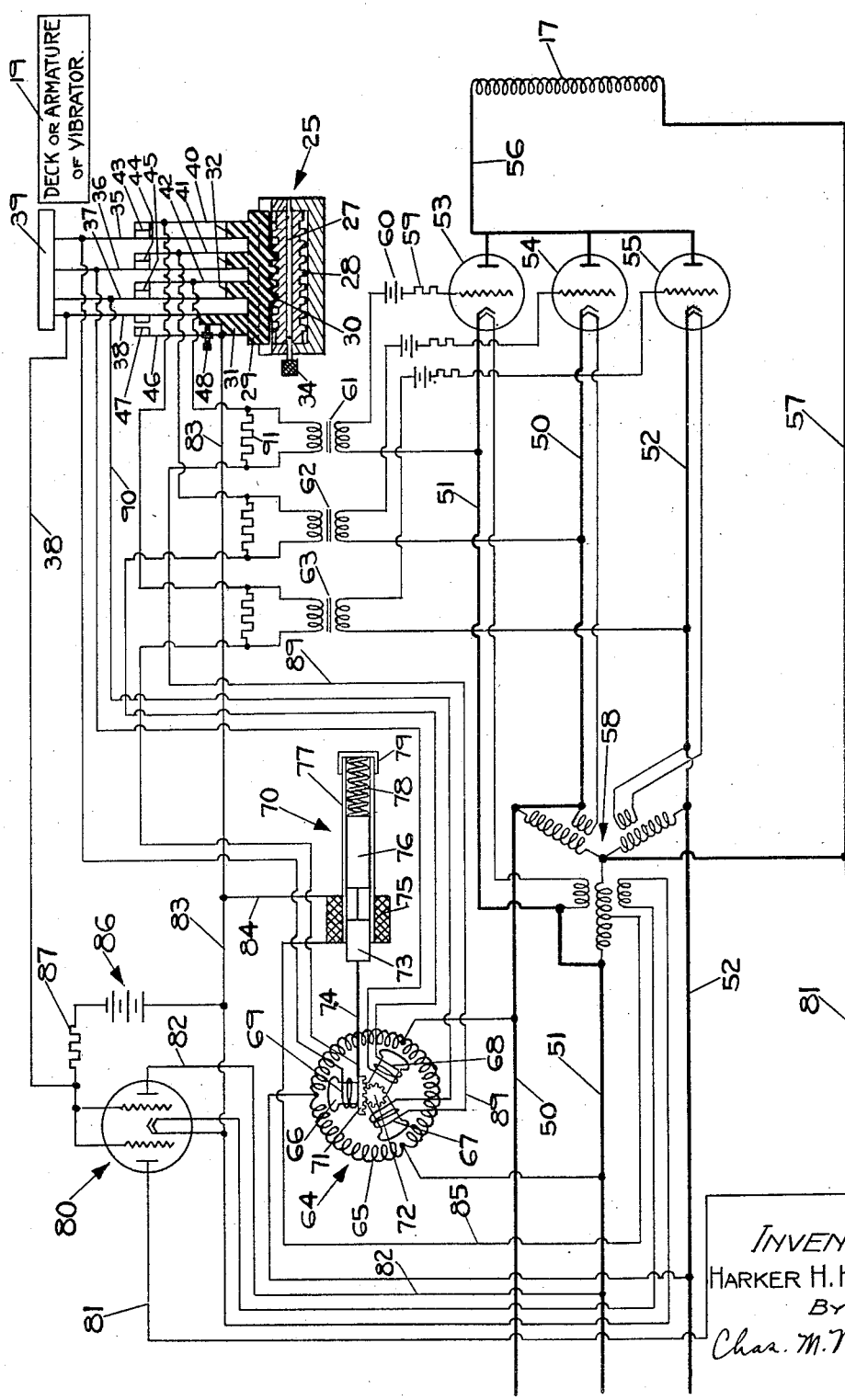
Fig. 2 is a wiring diagram of the control system of my invention for the vibratory feeder or motor showing certain control elements diagrammatically.

Referring particularly to Fig. 2 of the drawings, there is seen a source of electric current which, in this illustration, comprises three phase alternating current of any desired frequency which is delivered over the three power line conductors 50, 51 and 52. Associated with the source of current are three electron relays or electric valves which are preferably of the vapor or gaseous electric discharge type comprising relays or valves 53, 54 and 55. The valves illustrated are of the three electrode type each including an indirectly heated cathode, a grid and an anode. The anodes of the three valves 53, 54 and 55 are all connected in parallel and led by conductor 56 to the field winding 17 of the vibratory motor 10, the other terminal of which field winding 17 leads by way of conductor 57 to the center tap of a star connected three phase transformer or network 58.

As illustrated in the drawings, the cathodes of the valves 53, 54 and 55 are indirectly heated by filaments which are separately energized by secondary windings associated with the transformer 58. It is, of course, evident that any other appropriate means may be employed for heating the filaments associated with said cathodes, such as a separate transformer with three secondaries.

To control the flow of current from the conductors 50, 51 and 52 to the field winding 17 through the valves or relays 53, 54 and 55 in accordance with the natural period of vibration of the conveyor or vibratory motor each of said valves or relays 53, 54 and 55 is provided with a control or grid circuit including a grid resistor, grid biasing battery and excitation transformer. Those parts for the valve 53 comprise the grid resistor 59, biasing battery 60 and excitation transformer 61.

As illustrated in the drawings, the valves or relays 53, 54 and 55 are preferably of the type that, in the absence of a negative bias on the grid they are conducting, it being understood, of course, that unless the excitation transformers, such as transformer 61, are excited, the biasing batteries, such as the battery 60, maintain a negative bias on the grids to render all of said valves or relays 53, 54 and 55 nonconducting. If desired, these valves or relays 53, 54 and 55 may be of the type which are normally non-conducting when there is no bias on the grid and are rendered conducting only when a positive bias is placed upon the grid. In case said valves or relays are of this type, the biasing batteries, such as the battery 61, may be eliminated.

In addition to the grid control circuit for the valve or relay 53, as above described, including the excitation transformer 61, it is, of course, evident by reference to Fig. 2 that a similar and independent grid control circuit is provided for each of the relays or valves 54 and 55 and the grid control circuit for relay or valve 54 includes an excitation transformer 62 while the grid control circuit for relay or valve 55 includes an excitation transformer 63.

To provide for the excitation of the grids of the valves or relays 53, 54 and 55 to render them conducting and non-conducting in accordance with the natural period of vibration of the vibratory conveyor or motor, and also to control the amount of current delivered to the field winding 17 so as to maintain the amplitude of vibration of the deck or armature of the vibratory motor or conveyor substantially constant at a predetermined value, I provide controllable energizing circuit means for the excitation transformers 61, 62 and 63, now to be described.

Associated with the conductors 50, 51 and 52 is a phase shifting mechanism 64 which is generally of a construction well understood in the electrical art and may be briefly described as comprising a stator winding 65 connected at equi-distant points to the three conductors 50, 51 and 52 to provide a rotating magnetic flux within the phase shifting mechanism. The phase shifting mechanism additionally includes an adjustable rotor 66 carrying three independent phase windings 67, 68 and 69.

The phase relation of the voltages induced in the windings 67, 68 and 69 with respect to the voltages on the conductors 50, 51 and 52 will, of course, depend upon the position of the rotor 66 and to control this phase relation a phase adjusting mechanism 70 is provided. The phase adjusting mechanism 70 comprises a rack 71 which meshes with a pinion 72 mounted upon the shaft of the rotor 66. The rack 71 is actuated from a plunger or armature 73 by way of an actuating rod 74, which plunger 73 is associated with a solenoid 75 which, when energized, is adapted to move the plunger 73 to the right, as viewed in Fig. 2 of the drawings.

The plunger 73 is mechanically connected to a damping piston 76 adapted to slide in an elongated cylinder 77 and make a relatively close contact therewith which tends to cause slow movement of the piston 76 in the cylinder 77 under the influence of the solenoid 75 or of a spring 78 which tends to push the cylinder 76 toward the left, as viewed in Fig. 2 of the drawings.

The cylinder 77 is preferably made of insulating material. The right hand end of the cylinder 77 is provided with a removable cap 79 which is preferably threaded thereto to provide for the insertion and removal of the spring 78. In practice, preferably a plurality of springs 78 are provided to adjust the speed of movement of the piston 76 under the influence of said spring. If desired, extensive threads may be provided on the cap 79 and the cylinder 77 as another means of adjusting the effective rate of movement of the piston 76 under the influence of said spring 78.

To provide a source of power for the solenoid 75 I provide a full-wave rectifier tube 80, the two plates of which may be energized from any desired source. In Fig. 2 of the drawings the plates are connected across the terminals of one of the windings of the transformer 58 by conductors 81 and 82, and the cathode is connected to the center tap thereof in series with the solenoid 75 by way of conductors 83, 84 and 85.

If desired, and particularly in the interest of maintaining a balance on the transformer 58, a separate energizing transformer may be supplied for the rectifier tube 80 which may be connected across any of the two lines 50, 51 and 52. Also, in Fig. 2 of the drawings, an obvious heater circuit is provided for the heating element of the cathode of said tube 80. The tube 80 is maintained in a normally non-conducting condition by virtue of a negative bias being placed on the two grids thereof from bias battery 86 which is connected between the cathode and the two grids of said tube 80 through grid resistor 87.

As hereinafter described in more complete detail, when the contacts of switch 47 are closed, the bias battery 86 will be shunted through grid resistor 87 over conductor 83 and conductor 38 thereby removing the negative bias from the grids of the tube 80. Said tube 80 is preferably of the vapor electron discharge type which is normally conducting in the absence of a negative grid bias being rendered non-conducting by a suitable grid bias as provided by battery 86.

Complete circuits for the various elements above described are described below in connection with the description of the operation of the apparatus with the consequent realization of the method of my invention. Assuming that the conveyor is in a non-operating condition and it is desired to start it into operation the parts will be substantially in the positions illustrated in Figs. 1 and 2 of the drawings. Upon the closure of the main line switch (not shown), to the conductors 50, 51 and 52, three phase alternating current will be delivered to said conductors 50, 51 and 52, and alternating current voltages will be transferred to the relays or valves 53, 54 and 55 by way of said conductors 50, 51 and 52, and by way of the conductor 57 associated with the center tap of the transformer 58 and field winding 17 of the vibratory conveyor.

Each of the relays or valves 53, 54 and 55 is, however, provided with a normal negative bias on the grid thereof provided by the grid circuit above described, including the battery and grid resistor such as battery 60 and grid resistor 59 associated with the relay or valve 53. It is manifest, however, that if an alternating current of the proper voltage is supplied to the secondaries of the transformers 61, 62 and 63 which has the proper phase relation to the voltage impressed upon the cathode-anode circuit of the each tube 53, 54 and 55, that said tubes 53, 54 and 55 will become conducting in sequence 120 degrees apart due to the fact that three phase cathode-anode voltages supplied to said tubes 53, 54 and 55 have this phase relation. These alternating current voltages supplied to the secondaries of the transformers 61, 62 and 63 will, of course, tend to overcome the negative grid bias on said tubes 53, 54 and 55 during half of the cycle thereof, and to increase the negative grid bias during the other half of the cycle. If these voltages are in phase with the cathode anode voltages it is evident that a maximum amount of current will flow through each valve or relay 53, 54 and 55 during each half cycle that the cathode-anode voltage is of the proper polarity.

It is further evident that if this phase relation between the cathode-anode voltage and the grid voltage is adjusted so that they become out of phase a progressively increasing amount, the amount of current which flows through each valve or relay 53, 54 or 55 during each period of conductivity thereof will be progressively decreased and it may be stated that the apparatus is so adjusted that the phase shifting mechanism 64 controls this phase relation automatically to maintain the amplitude of vibration of the conveyor substantially constant.

The circuits which energize the transformers 61, 62 and 63 from the windings 67, 68 and 69 respectively, are easily traced by reference to Fig. 2 of the drawings, but in the interest of completeness that for transformer 61 will be completely traced. Starting from one side of the winding 67 the circuit leads by way of conductor 89 to one terminal of the primary of the transformer 61, the other terminal of which leads by way of a short conductor to spring plate 42 which being of conducting material leads to the contacts of normally closed switch 45 from which the circuit extends by way of spring plate 37 of conducting material to conductor 90 which leads to the other terminal of the winding 67. It is thus evident that an alternating current voltage of adjustable phase is supplied to the grid transformer 61 and is under the control of the contacts of switch 45. As previously indicated, by adjusting the position of the rotor 66, by the phase shifting mechanism 64, as hereinafter described in complete detail, the effective impedance of the relays or valves 53, 54 and 55 may be adjusted and the period of conductivity and thus the amount of current which flows through it during each cycle may be adjusted.

It is also to be noted that the primary terminals of the transformer 61 have a resistor 91 connected across them which provides a voltage drop which is impressed upon said transformer primaries.

It may be stated that the transformer 62 is connected in a manner quite similar to the connections to transformer 61 to the phase winding 68 and is controlled by the contacts of switch 44. Likewise, transformer 63 is energized from phase winding 69 and is controlled by contacts of switch 43.

It may be stated that the spring 78 of the phase adjusting mechanism 70 when in its extreme position of adjustment, that is, with the piston 76 and plunger 73 moved to their extreme lefthand position, the phase relation of the impressed grid voltage on the relays or valves 53, 54 and 55 is such as to produce a maximum current flow through said relays or valves and to said field winding 17. Therefore, when the main switch is thrown, as above set forth, a maximum amount of current will flow through the relays or valves 53, 54 and 55 to the field winding 17 of the vibratory conveyor. This energization of the field winding 17 will attract the armature 14 of said vibratory conveyor and pull the armature shaft 13 and deck 19 rearwardly which will be effective to open the contacts of the switches 43, 44 and 45. This opening of said contacts 43, 44 and 45 will de-energize the transformers 61, 62 and 63 under which conditions the normal negative grid bias will be applied to the grids of said relays or valves 53, 54 and 55 and render them all non-conducting, thereby shutting off the current flow to the field winding 17. This, of course, will allow the armature 14, armature shaft 13 and deck 19 to move to the right, as viewed in Fig. 1 of the drawings, under the influence of the energy stored up in the spring bars 12. This movement of the deck 19 and armature shaft 13 to the right will cause switches 43, 44 and 45 to close again which will result in the energization of transformers 61, 62 and 63 to allow another impulse of current to flow through the relays or valves 53, 54 and 55 to the winding 17 under which conditions the above described action will be repeated.

It is thus evident that the vibratory conveyor will be set into vibratory motion which will continue so long as the main line switch is closed.

It is, of course, evident that due to the three phase relation of the voltages applied to relay or valves 53, 54 and 55 these valves will not conduct current simultaneously but will conduct current in sequence. Due to the overlapping of the half cycles of the three phases, one of said relays or valves 53, 54 and 55 will substantially always be conducting and thus there will always be current available for the field winding 17 from one of said relays or valves 53, 54 and 55. This current supply to the field winding 17 will, of course, be pulsating direct current and the impedance of the winding 17 will tend to smooth out the ripples therein. Should said winding 17 not be sufficient as a filter to smooth out the ripples any additional filter of well-known construction may be added.

Furthermore, if desired, instead of a three phase out-put, a six phase out-put may be employed, using six tubes, the grids of which are independently controlled through a phase shifting mechanism which has six windings instead of three. Such a system is disclosed in Fig. 4 of the drawings except that instead of a phase shifting mechanism I have shown a grid bias voltage control mechanism, but it is to be understood that the six phase system of Fig. 4 may be employed with the phase shifting mechanism disclosed in Fig. 2 with the obvious necessary modifications, as above set forth, and of course, with three more switches on switch mechanism 25 to provide independent control for each of the relays or valves.

The amplitude of vibration of the vibratory conveyor or motor is adjusted in a rough manner merely by adjusting the switch mechanism 25; that is, by operating the handle 34, the striking plate 39 may be moved towards and from the normal position of the deck 19 or armature shaft 13 which strikes it. It is, of course, evident that by moving the striking plate 39 close to the deck 19 the switches 43, 44 and 45 will be opened on a relatively short stroke of the armature or deck which, in itself, will tend to control the amplitude of vibration by cutting short the time of the current flow to the field winding 17. However, to make for a more accurate adjustment which will maintain the amplitude of vibration substantially constant at any adjustable value the phase shifting mechanism 64 is operated from the phase adjusting mechanism 70 by way of switch 47 in a manner now to be described.

As was previously set forth, the spring 78 tends to move the plunger 73 to the left, as viewed in Fig. 2, which tends to bring the phase relation of the grid potentials on the relays or valves 53, 54 and 55 in phase with the anode-cathode potential which tends to produce a maximum current flow through said relays or valves 53, 54 and 55. Therefore, the spring 78 continuously tends to increase the amplitude of vibration of the deck or armature of the conveyor or motor by tending to increase the current flow thereto. The contacts of switch 47 if closed periodically during each backward portion of the stroke of the deck or armature of the vibratory conveyor or motor, closes a circuit which controls the flow of current to solenoid 75 which, when energized, tends to move the plunger 73 to the right, as viewed in Fig. 2 of the drawings which, in turn, tends to shift the phase shifting mechanism 64 to decrease the current flow through the tubes 53, 54 and 55. This control is effected as follows.

The solenoid 75 is connected in the cathode-anode circuit of the full-wave rectifier 80. The circuit may be traced from the cathode thereof by way of conductor 83, conductor 84, solenoid 75 and conductor 85 to the center tap of the transformer, the outer terminals of which are connected to the opposite plates of the full-wave rectifier 80 by way of conductors 81 and 82. Unless the contacts of switch 47 are closed no current will flow in solenoid 75 because of the negative bias on the grids of the tube 80 effected by battery 86, as above set forth. However, should the amplitude of the vibration of the deck 19 or armature 13 of the conveyor or motor be sufficient to close the contacts of switch 47, the negative bias on tube 80 will be temporarily removed, as above described, and an impulse of current will flow to the solenoid 75 and move the moving parts of phase adjusting mechanism 70 to the right, which will adjust the phase shifting mechanism 64 to decrease the current flow through relays or valves 53, 54 and 55.

It is thus evident that spring 78 continuously acts in a manner which tends to increase the amplitude of vibration of the conveyor or motor which, unless counteracted, would cause the closure of the contacts of switch 47 during each stroke of the vibratory conveyor or motor. However, when said contacts of switch 47 are closed, due to the increased amplitude of vibration, the phase adjusting mechanism 70 will operate through plunger 75 to control phase shifting mechanism 64 to reduce the amplitude of vibration of the deck 19 and armature shaft 13. As a consequence, the mechanism will operate automatically so that phase adjusting mechanism 70 floats back and forth to maintain the amplitude of vibration of the conveyor or motor so that contacts of switch 47 are just slightly closed during each vibratory movement of the deck 19 or armature shaft 13.

To provide for the independent adjustment of the switch 47 superposed on the adjustment of this switch in combination with switches 43, 44 and 45, the screw mechanism 48, above described, is provided. It is thus evident that by setting the switch mechanism 25 to any predetermined position, as determined by the scale 33, the amplitude of vibration of the vibratory conveyor or motor may be maintained substantially constant.

Furthermore, it is a matter of considerable importance, as previously indicated, that the vibratory conveyor or motor operates at its own natural period of vibration and directly controls the frequency of the impulses fed to it thereby insuring that said impulses will have the same frequency as its natural period of vibration. Furthermore, this control is effected without requiring the interruption of any power circuits by virtue of the fact that it is controlled by controlling the current flow through electron relays or valves by controlling the grid bias of said valves, it being well known that the currents which flow in the grid circuits of such tubes are extremely small under any conditions.

It is, of course, evident, that the natural period of vibration of the vibratory conveyor or motor is determined by the weight of the mass to be vibrated and the restoring force of the spring bars 12. That is, the spring bars 12 in cooperation with the mass to be vibrated comprising the armature shaft 13, armature 14 and deck 19 and any parts which are rigidly attached thereto, forms a vibratory system having a natural period of vibration and this natural period of vibration will vary with the number and size of the spring bars 12 and with the weight of the parts supported thereby.

As was above set forth, in previous machines of this general type, it has been a somewhat protracted operation to select the exact number and size of bars 12 to predetermine the natural period of vibration of the vibratory system to a definite relation to the frequency of the available current. In the apparatus and method of my invention this is entirely eliminated because any number of bars 12 may be supplied which approximately approaches the desired frequency of vibration of the system which can be calculated within a fairly close degree of accuracy, such as within ten percent, and no further determination is necessary because the impulses supplied to the vibratory conveyor or motor are controlled directly by and in exact synchronism with said natural period of vibration.

As was further set forth, this eliminates entirely the problem encountered where the frequency of the available source is not constant. Still further, this makes for a mechanism of the highest efficiency because it is well known that when a vibratory conveyor or motor operates at its natural period of vibration maximum efficiency is realized. The automatic control of the amplitude of vibration makes this operation at the natural period of vibration quite practical though it is to be understod that the system and method has considerable advantage over prior art devices even though the amplitude of vibration is controlled entirely mechanically, as by a rheostat, though such a mechanism would require fairly close supervision or some additional protective means to prevent damage to the equipment in case all the load was taken off the deck, or other vibratory mass.

It is furthermore evident that the mechanism for controlling the amplitude of vibration and maintaining it constant may be employed with a conveyor or motor of the vibratory type known in the prior art in which the conveyor or motor does not control the frequency of the impulses supplied to it. In such a case, instead of employing the phase adjusting mechanism 64, the mechanism 70 will be employed to control a rheostat in series with the field winding 17. In short, in the complete system and method it is preferred that both the constant amplitude maintaining mechanism and the frequency controlling mechanism which controls the frequency of the impulses supplied to the motor by the natural period of vibration of the motor itself be employed; but either of said mechanisms may be independently employed.

In Fig. 3 of the drawings, there is illustrated a partial circuit which is to be understood as a modification of the circuit of Fig. 2 in which the bias on the grids of tube 80 is normally negative but which will be removed entirely under conditions of substantial equality between the amplitude of vibration and the desired amplitude of vibration, while under conditions of extreme vibration as compared to the desired amplitude of vibration a positive bias will be placed upon the grids of the tubes to increase to a maximum the conductivity thereof. The tube 80 employed in this circuit preferably has a characteristic that when there is no bias on the grids an average amount of current will flow, when there is a positive bias a greater amount of current will flow, and when there is a negative bias no current will flow. In this modification of the circuit the sliding bar 29 is provided not only with the adjustable switch 47 but with an additional switch 47' which is normally closed and includes one contact carried by the spring plate 38 and another contact carried by an adjustable spring plate 46' which may be adjusted by adjusting screw 48'.

Under normal conditions a negative bias will be placed upon the grids of the tube 80 by way of grid resistor 87', conductor 88', spring plate 38, the contacts of switch 47', spring plate 46', conductor 92, negative terminal of battery 93, conductor 94 which leads to the cathode of the tube 80 and is connected to an intermediate point of the battery 93. It is evident that under these conditions negative bias is placed on the grids of the tube 80. The spring plate 46 in this modification of the circuit is connected to the positive terminal of the battery 93 by conductor 95.

During a normal stable operation of the apparatus the contacts of switch 47' will be opened on the reverse movement of each stroke of the vibratory feeder or motor. This will remove the normal negative grid bias on the tube 80 and permit current impulses to flow through the solenoid 75 which counteracts the action of spring 78 to maintain the amplitude of vibration of the deck 19 on armature shaft 13 substantially constant. Should there be any sudden increase in the amplitude of vibration of the deck 19 or armature shaft 13 this will not only break the contacts of switch 47' but will close the contacts of switch 47 for each stroke of the vibratory conveyor or motor. When this condition is realized the positive bias on the grids of the tube 80 will increase substantially the flow of current to the solenoid 75 from the normal flow, as above described, which will operate to reduce in a very short interval of time the current flow through the relays or valves 53, 54, 55. In other words, during normal conditions the balance between the amplitude of vibration of the conveyor or motor and the current flow to the winding is controlled by just opening the contacts of switch 47'. In case of an abnormal condition, where the amplitude of vibration becomes excessive, the contacts of switch 47 are closed to remedy the situation in a very short time.

Attention is now directed to Fig. 4 of the drawings and to another embodiment of my invention. In the embodiment of the invention of said Fig. 4, main line conductors 100, 101 and 102 terminate in a delta-connected primary of a transformer 103, the secondary of which is connected in six phase star in a well known manner. The outer terminal of each of the six phases of the transformer 103 leads to an electron discharge relay or valve preferably of the gaseous or vapor type, the six valves being seen at 104, 105, 106, 107, 108 and 109. Each of said valves or relays 104 to 109, inclusive, is preferably of the three electrode type and the plate or anode of each valve 104 to 109, inclusive, is connected to an outer terminal of an individual winding of the secondary of the transformer 103. The cathodes of all of the valves 104 to 109, inclusive, are connected in parallel to a conductor 110.

In the interest of simplification the heating circuits for the cathodes of the valves 104 to 109, inclusive, are not shown but it is obvious that they may all be heated from a single heating transformer which may be connected across any two of the power lines 100, 101, 102, or in any other desired manner. One terminal of the field winding 17 is connected by way of conductor 111 to the center tap of the secondary of transformer 103. The other terminal of said field winding 17 is connected to the cathodes of the valves or relays 104—109, inclusive, which, as above set forth, are all connected in parallel.

It is thus manifest that, ignoring for the moment the action of the control grids of the valves or relays 104—109, inclusive, six phase pulsating current will be supplied from said valves or relays to the field winding 17. As is well known, such a current is a direct current with a very slight ripple which is of insignificant consequence.

To control the feeding of the current to the field winding 17 in impulses as determined by the natural period of vibration of the vibratory conveyor or motor in the manner generally above described, the grids of the valves or relays 104—109, inclusive, are controlled from switch mechanism 25' similar to the above described switch mechanism 25 except that the number of necessary make and break contacts is appreciably reduced. Furthermore, the mechanism for maintaining substantially constant the amplitude of vibration of the feeder or vibratory motor at any adjustable amplitude is controlled by a modified mechanism from that of Fig. 2. It is to be distinctly understood, however, that the phase shifting amplitude control mechanism of Fig. 2 may be employed in lieu of that shown in Fig. 4 by obvious modifications which includes a six phase shifting mechanism similar to that seen at 64 in Fig. 2 and six grid control circuits with six control switches similar to the three grid control circuits and three grid control switches of Fig. 2.

The valves or relays 104—109, inclusive, are of the type that in the absence of a positive grid bias, current will not flow between the cathode and anode and, as is generally characteristic of these tubes, the amount of current flow increases with an increase of positive grid bias.

With the deck 19 or armature shaft 13 out of engagement with the striking plate 39 the contacts of normally closed switch 45 will, of course, be closed and close the circuit from all of the cathodes by way of conductor 110 to the negative terminal of grid biasing battery 112 across the terminals of which a potentiometer resistor 113 is connected. Adjustable contact 114 which cooperates with the resistor 113 is connected by way of conductor 115 to spring plate 57 and through the normally closed contacts of switch 45 to spring plate 42 which is connected by conductor 116 to all of the grids of the valves or relays 104—109, inclusive, through individual grid resistors, that for valve or relay 104 being seen at 117.

The phase adjusting mechanism 70 of Fig. 2 is employed intact as a grid biasing mechanism and the actuating rod 74 controls the position of the adjustable contact 114. The maximum stroke of the rod 74 is preferably sufficient to cover substantially the entire resistor 113 from one terminal to the other.

As previously described, under normal conditions the spring 78 will move the plunger 73 to the extreme left which will make the grid bias on the grids of valves or relays 104—109, inclusive, a maximum in the positive sense. As a consequence, upon the closure of the main line switch (not shown), to the conductors 100, 101 and 102, six phase rectified, or resulting substantially steady current, will flow to the winding 17 of the motor 10 and attract the armature 14 thereof which, by virtue of the contact between the deck 19 or armature shaft 13 will interrupt this flow of current by breaking the contacts of switch 45 which remove the positive bias from the grids of the valves or relays 104—109, inclusive, which results in their becoming non-conducting, as above described.

This is effective to set the vibratory conveyor or motor into operation and the amplitude of vibration is maintained constant by virtue of the fact that the spring 78 tends to increase the current flow in the winding 17 to a maximum by providing a maximum positive bias on the grids, valves or relays 104—109, inclusive, which will cause the closing of the contacts of switch 47 during the backward portion of each stroke of the vibratory motor 10. Each closure of said contacts 47 will cause a momentary energization of the winding 75 by way of conductor 100, battery 112, conductor 118, solenoid 75 and conductor 119. This will operate in a manner evident from the above description to urge the solenoid 73 to the right, as viewed in Fig. 4, to decrease the current flow through the valves or relays 104—109, inclusive, by reducing the value of the grid bias of each of said valves or relays.

As has been previously set forth, the mechanism for maintaining a substantially constant adjustable amplitude of vibration, as disclosed in Fig. 4 of the drawings, may be substituted for the mechanism for performing this function as shown in Fig. 2 of the drawings, and vice versa.

Referring particularly to Fig. 5 of the drawings, there is shown a modification of the system of Fig. 4 in which the source of current is direct current. In the system of Fig. 5 direct current is supplied over two main line conductors 120 and 121 to the field winding 17 of the vibratory motor or conveyor and a three electrode electron discharge valve or relay, preferably of the gaseous type having a special control grid capable of shutting off the current flow therethrough, or of the vacuum type, seen at 122, is interposed in the conductor 120. The grid of said valve or relay 122 is controlled through a grid resistor in the manner above described in connection with Fig. 4, it being understood that the conductors 110 and 116 of Fig. 5 lead to the same mechanism and circuit as the conductors 110 and 116 of Fig. 4.

From the above description of the invention it is to be noted that current of any frequency, and this expression includes direct current which has a frequency of zero, is controlled preferably by three electrode valves or relays, though any other well known type of controllable valves or relays may be employed, such as magnetrons, to deliver a pulsating current, the control means involving the interruption of a control circuit in which very small currents flow, if any. Furthermore, the frequency of the impulses are entirely independent of the frequency of the in-put current or the number of phases thereof so long as the delivered current may be of a substantially continuous character independent of the control grids.

Furthermore, the frequency of the delivered current is controlled directly by the mechanism to which the current impulses are delivered, which mechanism is designed to have a natural period of vibration which may or may not be accurately predetermined and generally will not be predetermined with particular accuracy.

Still further, the amplitude of vibration of the vibratory conveyor or motor is automatically adjusted to be maintained substantially constant at any selected value which may be continuously varied between the maximum possible amplitude of vibration of the vibratory equipment and almost an imperceptible amount of vibration measurable in thousandths of an inch.

The apparatus and method has the distinct advantages of being operable from a source of power which may be of variable frequency; of not requiring exact tuning of the vibratory system to a predetermined frequency of vibration; and of providing for maximum efficiency of a vibratory conveyor or motor, which conveyor or motor acts directly upon the material or object to be treated, such as acting directly upon the conveyor pan which supports the material to be conveyed.

Furthermore, the automatic control of the amplitude of vibration acts as a protector for the vibratory conveyor or motor to prevent its doing damage to itself under no-load conditions.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a vibratory electro-magnetic apparatus, the combination with a deck, of a vibratory electro-magnetic motor comprising a main frame, a vibratory frame attached to said deck, spring means attaching said vibratory frame to said main frame for vibratory movement relative thereto and providing a vibratory system having a natural period of vibration, electro-magnetic means for deflecting and releasing said spring means periodically; an electrical system for controlling the flow of current to said electro-magnetic means comprising a power circuit having uni-directional gaseous electronic relay means in circuit with the electro-magnetic means, said power circuit and electronic relay means being so constructed and arranged that it is capable of delivering continuous current to said electro-magnetic means, and control means constructed and arranged to control periodically the flow of current through said electronic relay means thereby to vary the energization of said electro-magnetic means periodically from said power circuit, said control means including mechanism operated by said motor to control the periodic variations of current flow to said electro-magnetic means as determined by the natural period of vibration of said vibratory system, and including means for affecting said electronic relay means automatically to maintain substantially constant the amplitude of vibration of said deck at a predetermined amount.

2. In a vibratory electro-magnetic apparatus, the combination with a deck, of a vibratory electro-magnetic motor comprising a main frame, a vibratory frame attached to said deck, spring means attaching said vibratory frame to said main frame for vibratory movement relative thereto and providing a vibratory system having a natural period of vibration, electro-magnetic means for deflecting and releasing said spring means periodically; an electrical system for controlling the flow of current to said electro-magnetic means comprising a power circuit having unidirectional electronic relay means in circuit with the electro-magnetic means, said power circuit and electronic relay means being so constructed and arranged that it is capable of delivering continuous current to said electro-magnetic means, and control means constructed and arranged to control periodically the flow of current through said electronic relay means thereby to energize said electro-magnetic means periodically from said power circuit, said control means including mechanism operated by said motor to control the periodic flow of current to said electro-magnetic means as determined by the natural period of vibration of said vibratory system, and including means for varying the amplitude of vibration of said deck.

3. In an electrical system, the combination with a vibratory apparatus including a deck and an electro-magnetic motor forming a vibratory system having a natural period of vibration, of a source of electrical current of any available frequency, and means including gaseous electronic relay means so constructed and arranged that it is capable of delivering a continuous current to said electro-magnetic motor controlled by the vibratory movement of said motor and constructed and arranged to cause electrical impulses to be delivered from said source of current to said motor to vibrate said vibratory system at its natural period of vibration, and further including means operative automatically to maintain the amplitude of vibration of said deck substantially constant at a selected value.

4. In an electrical system, the combination with a vibratory motor including a vibratory system having a natural period of vibration, of a source of electrical current, means including gaseous electronic relay means for conducting and controlling a flow of current from said source to said motor, said means being so constructed and arranged that it is capable of delivering continuous current to said motor means for controlling the flow of current through said relay means to cause it to flow in impulses including control circuit means, means operated in response to the frequency of the vibratory movement of said motor for controlling said control circuit means to control the frequency of the current delivered to said motor to maintain the frequency of said impulses in synchronism with the natural period of vibration of said vibratory system, and amplitude responsive means for controlling said control circuit means supplementary to said frequency responsive means constructed and arranged to maintain its amplitude of vibration substantially constant at a predetermined value.

5. In an electrical system, the combination with a vibratory electro-magnetic motor, of a source of current, means for adjusting the current flow to said motor to maintain its amplitude substantially constant comprising, a current controller, means independent of said motor normally urging said controller to current increasing position, and means including a switch actuated responsive to the amplitude of vibration of said motor to urge said controller to a current decreasing position upon a predetermined amplitude of vibration being reached.

6. In an electrical system, the combination with a vibratory electro-magnetic motor, of a source of alternating current, a plurality of three electrode electron relays for controlling a flow of pulsating current from said source to said motor, a grid control circuit individual to each relay, means for controlling said grid control circuits to render said relays successively conducting and non-conducting at a frequency determined and controlled by said motor, and means including phase adjusting mechanism for supplying undulatory potentials to said grid circuits and controlled by the amplitude of vibration of said motor to maintain its amplitude substantially constant.

7. In an electrical system, the combination with a vibratory motor including a vibratory system having a natural period of vibration, of a power circuit for said motor including gaseous electronic relay means for conducting and controlling a flow of current from a source to said motor and being so constructed and arranged that it is capable of delivering continuous current thereto, means for controlling the flow of current through said relay means, means responsive to the frequency of vibration of said motor as determined by the natural period of vibration of said motor for controlling said control means to cause current impulses to flow to said motor at a frequency in synchronism with said natural period of vibration, and means responsive to the amplitude of vibration of said motor supplementary to said frequency responsive means constructed and arranged to exercise a further control on said control means to maintain the amplitude of vibration of said motor substantially constant, said last named means including means for varying a voltage applied to said control means.

8. In an electrical system, the combination with a vibratory motor including a vibratory system having a natural period of vibration, of a power circuit for said motor including gaseous electronic relay means for conducting and controlling a flow of current from a source to said motor and being so constructed and arranged that it is capable of delivering continuous current thereto, means for controlling the flow of current through said relay means, means responsive to the frequency of vibration of said motor as determined by the natural period of vibration of said motor for controlling said control means to cause current impulses to flow to said motor at a frequency in synchronism with said natural period of vibration, and means responsive to the amplitude of vibration of said motor supplementary to said frequency responsive means constructed and arranged to exercise a further control on said control means to maintain the amplitude of vibration of said motor substantially constant.

9. In an electrical system, the combination with a vibratory motor having a load supporting deck and including a vibratory system having a natural period of vibration, of a source of alternating current, a power circuit for said motor including electronic relay means having an anode and a cathode for conducting and controlling a flow of current from said source to said motor and being so constructed and arranged that it is capable of delivering continuous current thereto, a control circuit energized from a source of alternating current including means for controlling the flow of current through said relay means comprising grid means therefor, means responsive to the frequency of vibration of said motor as determined by its natural period of vibration for controlling said control means to cause current impulses to flow to said motor at a frequency in synchronism with said natural period of vibration, and means responsive to the amplitude of vibration of said motor supplementary to said frequency responsive means constructed and arranged to exercise a further control on said control means to maintain the amplitude of vibration of said motor substantially constant by automatically adjusting the phase relation between the anode and grid voltages of said relay means.

10. In an electrical system, the combination with a vibratory motor having a load supporting deck and including a vibratory system having a natural period of vibration, of a source of alternating current, a power circuit for said motor including electronic relay means having an anode and a cathode for conducting and controlling a flow of current from said source to said motor and being so constructed and arranged that it is capable of delivering continuous current thereto, a control circuit energized from a source of alternating current including means for controlling the flow of current through said relay means, means responsive to the frequency of vibration of said motor as determined by its natural period of vibration for controlling said control means to cause current impulses to flow to said motor at a frequency in synchronism with said natural period of vibration, and means responsive to the amplitude of vibration of said motor supplementary to said frequency responsive means constructed and arranged to exercise a further control on said control means to maintain the amplitude of vibration of said motor substantially constant by automatically adjusting the phase relation between the anode and control means voltages of said relay means.

11. In an electrical system, the combination with a vibratory motor including a vibratory system having a natural period of vibration, of a source of alternating current, a power circuit for said motor including electronic relay means having an anode and a cathode for conducting and controlling a flow of current from said source to said motor and being so constructed and arranged that it is capable of delivering continuous current thereto, a control circuit energized from a source of alternating current including means for controlling the flow of current through said relay means comprising grid means therefor, means responsive to the frequency of vibration of said motor as determined by its natural period of vibration for controlling said control means to cause current impulses to flow to said motor at a frequency in synchronism with said natural period of vibration, and means responsive to the amplitude of vibration of said motor supplementary to said frequency responsive means constructed and arranged to exercise a further control on said control means to maintain the amplitude of vibration of said motor substantially constant by automatically adjusting the phase relation between the anode and grid voltages of said relay means.

12. In an electrical system, the combination with a vibratory motor including a vibratory system having a natural period of vibration, of a source of alternating current, a power circuit for said motor including electronic relay means having an anode and a cathode for conducting and controlling a flow of current from said source to said motor and being so constructed and arranged that it is capable of delivering continuous current thereto, a control circuit energized from a source of alternating current including means for controlling the flow of current through said relay means, means responsive to the frequency of vibration of said motor as determined by its natural period of vibration for controlling said control means to cause current impulses to flow to said motor at a frequency in synchronism with said natural period of vibration, and means responsive to the amplitude of vibration of said motor supplementary to said frequency responsive means constructed and arranged to exercise a further control on said control means to maintain the amplitude of vibration of said motor substantially constant by automatically adjusting the phase relation between the anode and control means voltages of said relay means.

13. In an electrical system, the combination with a vibratory electro-magnetic motor, of a source of alternating current, electronic relay means having at least three electrodes including a grid and connected to control a flow of pulsatory current from said source to said motor, a grid control circuit, means for controlling said grid control circuit to render said relay successively conducting and non-conducting at a frequency determined and controlled by said motor, and means including phase adjusting mechanism for supplying undulatory potentials to said grid control circuit and controlled by the amplitude of vibration of said motor to maintain said amplitude substantially constant.

HARKER H. HITTSON.